Sept. 12, 1933. J. G. KING Re. 18,941

REFRIGERATING APPARATUS

Original Filed Dec. 31, 1927 2 Sheets-Sheet 1

Inventor

Jesse G. King

By Spencer Hardman & Fehr

Attorney

Sept. 12, 1933. J. G. KING Re. 18,941

REFRIGERATING APPARATUS

Original Filed Dec. 31, 1927 2 Sheets-Sheet 2

Jesse G. King Inventor

By Spencer Hardman & Fehr

Attorney

Reissued Sept. 12, 1933

Re. 18,941

UNITED STATES PATENT OFFICE 18,941

REFRIGERATING APPARATUS

Jesse G. King, Dayton, Ohio, assignor, by mesne assignments, to Frigidaire Corporation, a corporation of Delaware Original No. 1,761,041, dated June 3, 1930, Serial No. 243,987, December 31, 1927. Application for reissue February 23, 1932. Serial No. 594,675

12 Claims. (Cl. 220—24)

This invention relates to refrigerating apparatus and particularly to covers for the openings in ice cream cabinets of the type described in my application, Serial No. 86,586, filed February 6, 1926.

One of the objects of the invention is to provide an insulating cover for such cabinets which is stronger and more durable than those heretofore used.

Another object of the invention is to provide an internal reenforcing member which may be used to strengthen existing covers.

Further objects and advantages of the present invention will be apparent from the following description, reference being had to the accompanying drawings, wherein a preferred form of embodiment of the present invention is clearly shown.

Figure 1:
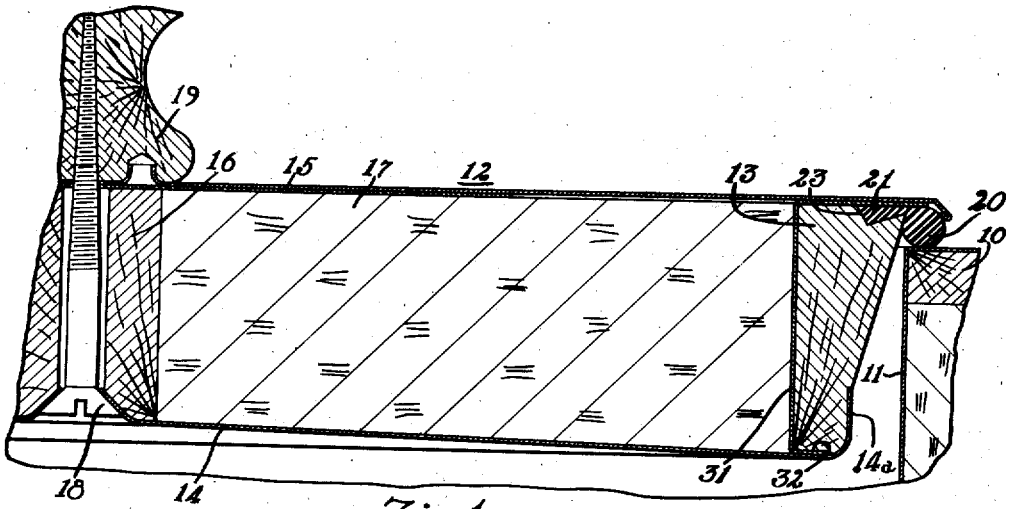
Fig. 1 is a vertical section of a portion of a cover embodying my invention.

Referring to Fig. 1, it is usual to provide an ice cream cabinet 10 having an opening 11 affording access to the interior of the cabinet and to close the opening by a cover 12. This cover 12 comprises a spacing ring 13 and a central spacing member 16 which are constructed of relatively hard, thermally non-conducting material, such as wood, rubber or fibre. These spacers are located between a bottom plate 14 and a top plate 15 which are preferably made of rust-resisting metal. The plate 14 is provided with a flange 14*a* for engaging the outer surface of the spacer 13. Insulating material 17, such as cork, is placed in the chamber formed by the spacers 13 and 16 and the top and bottom plates. All of the parts just mentioned are held in assembled relation by screw 18 and a knob 19. The top plate is thus supported centrally and its peripheral portion bears upon a gasket 20 of any suitable material having a bead portion 21 received by a groove 23 provided in the upper side of the spacer 13. The gasket 20 projects beyond the spacer 13 to provide a seal between the edge of top plate 15 and spacer 13 and is adapted to engage the top wall of the cabinet 10 to receive pressure due to the weight of the cover which is transmitted to it by a reenforcing member about to be described. Thus the gasket 20 seals the opening 11 of the cabinet.

Figure 2:
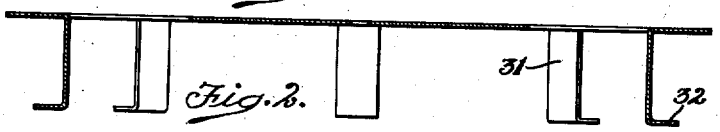
Fig. 2 is a vertical section of a reenforcing member.
Figure 3:
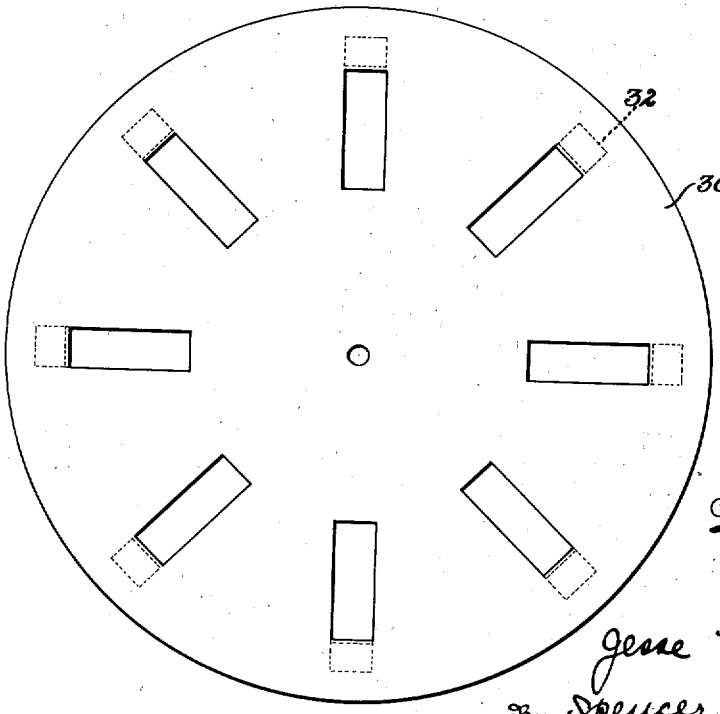
Fig. 3 is a plan of the reenforcing member.
Figure 5:
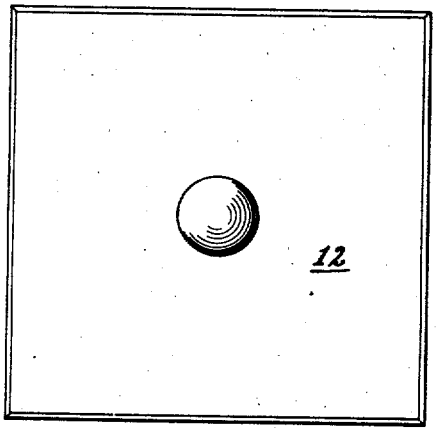
Fig. 5 is a plan of a modified form of cover.

It will be understood that Fig. 1 illustrates a vertical section of half of the cover as above described and that the cover is symmetrical about the screw 18 as shown in my application Serial No. 123,897, filed July 21, 1926. This cover may be either round as indicated in Figs. 1 to 3, or it may be rectangular, as shown in Fig. 5. In either case, I refer to the spacer 13 as a spacing ring or rim member to indicate a member disposed at the periphery of the plates and open in the center to receive insulation. This peripheral ring may thus be either round or rectangular.

Figure 6:
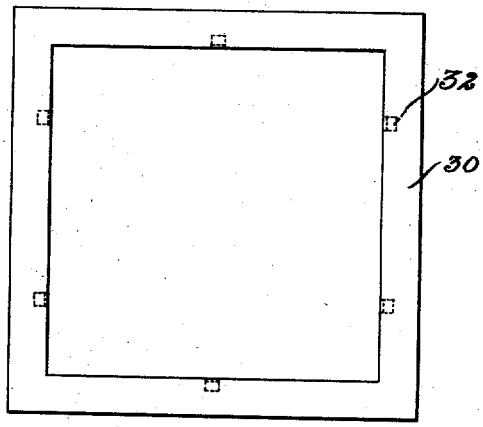
Fig. 6 is a plan of a modified form of reenforcing member.

In order to receive the supporting force of the cabinet transmitted to the lid through the gasket 20, I provide a reenforcing member which includes a plate disposed between the top plate 15 and the spacer 13 and also between the top plate and the gasket 20. As shown in Fig. 1 this plate projects beyond the edge of the spacer and over the projecting portion of the gasket 20. This plate may be either round or rectangular, and may also be either a peripheral member 30′ corresponding to the shape of the spacer as shown in Fig. 6 or it may be a solid plate 30 extending entirely across the surface of the cover plate 15, as shown in Figs. 2 and 3. In either event the plate is formed with a plurality of legs 31, preferably integral with the plate, which project below it and pass through the spacer 13. These legs 31 are held in position against the member 13 by the insulating material 17 of the cover. At their lower ends the legs are formed into feet 32 which engage the lower surface of the spacer and thus clamp the reenforcing member to the spacer. In this manner when the lid is placed on the cabinet the entire weight of the lid and the shock of dropping it in the cabinet opening is received by the reenforcing member through the gasket 20. Since the reenforcing member is supported on the peripheral member close to the point where these forces are received it acts as a very substantial support for the lid, relieving the cover plate 15 of all stress due to use of the lid.

Figure 4:
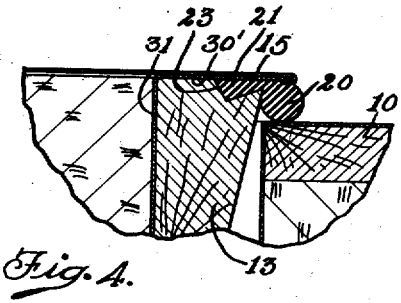
Fig. 4 is a vertical section of a portion of a cover showing a modified manner of assembling the cover and reenforcing means.

It has been found that lids made without the reenforcing member as shown in my application Serial No. 123,897, referred to above, are objectionable because the top plate 15 springs or warps away from the spacer when the lid is dropped into the opening and thus allows the gasket to escape from its confining groove 23. This is due to the fact that the cover member is supported by the knob at a point remote from the application of the force. My invention provides reenforcing members which can readily be inserted in existing lids, and thus remove this objectionable feature. It will be understood that the sheet metal of which the reenforcing member is made is sufficiently pliable to permit the bending of feet 31 into engagement with the lower surface of the spacer after the reenforcing member has been inserted in the cover. The reenforcing member may be likewise removed from the cover by bending the feet 31 away from the member 13.

Where the reenforcing member is placed in the lid while the lid is being manufactured, I prefer to spin the inturned edge of the top plate 15 over the edge of plate 30 or 30′ as shown in Fig. 4. Thus the reenforcing member when assembled in the cover is in interlocking engagement with the top plate 15 and with the rim member 13 and is removable from the cover and may, if desired, also be removed from the top plate by bending the inturned edge thereof away from the metal of the reenforcing member.

While the form of embodiment of the present invention as herein disclosed, constitutes a preferred form, it is to be understood that other forms might be adopted, all coming within the scope of the claims which follow.

What is claimed is as follows:

1. A cover for an opening in an ice cream cabinet comprising in combination a top plate, a bottom plate, a spacer separating the plates near their edges, means holding the plates together, a gasket projecting beyond the spacer for engaging the cabinet and means between the top plate and the spacer and projecting beyond the spacer to receive force transmitted to the cover thru the gasket.

2. A cover for an opening in an ice cream cabinet comprising in combination a top plate, a bottom plate, a spacer separating the plates near their edges, means holding the plates together, a gasket projecting beyond the spacer for engaging the cabinet, a plate member on the spacer projecting beyond the spacer between the gasket and the top plate and means for securing said member to the spacer.

3. A cover for an opening in an ice cream cabinet comprising in combination a top plate, a bottom plate, a spacing ring separating the plates near their edges, means holding the plates together, a gasket projecting beyond the spacing ring, a member between the top plate and the spacing ring and projecting beyond the spacing ring to receive force transmitted to the cover thru the gasket, legs secured to the member and projecting thru the spacing ring and means for securing said legs to the spacing ring.

4. An internal reenforcing means for an ice cream cabinet cover having a top plate, a bottom plate, a spacer separating the plates, and means for holding the plates together, comprising in combination a member for projecting beyond the spacer and means for securing the member to the spacer to support the cover.

5. An internal reenforcing means for an ice cream cabinet cover having a top plate, a bottom plate, a spacer separating the plates, and means for holding the plates together, comprising in combination a member having a portion adapted to engage the upper surface of the spacer and to project beyond the spacer, legs on the member for passing through the spacer and means on said legs for securing the member to the spacer to support the cover.

6. An internal reenforcing means for an ice cream cabinet cover having a top plate, a bottom plate, a spacer separating the plates and means for holding the plates together, comprising in combination an integral sheet metal stamping including a member adapted to engage the upper surface of the spacer and project beyond the spacer, a plurality of legs for passing through the spacer and a plurality of feet on said legs for engaging the lower surface of the spacer for clamping the reenforcing member to the spacer.

7. A cover for an opening in an ice cream cabinet comprising in combination a top plate, a bottom plate, a spacing ring separating the plates near their edges, means holding the plates together, a gasket projecting beyond the spacing ring, a member between the top plate and the spacing ring and projecting beyond the spacing ring to receive force transmitted to the cover through the gasket, the edge of the top plate being formed to enclose the edge of the member, legs secured to the member and projecting through the spacing ring and means for securing said legs to the spacing ring.

8. A cover for an opening in an ice cream cabinet comprising in combination a top plate, a bottom plate, a spacer separating the plates near their edges, means holding the plates together, the top plate projecting beyond the spacer and a supporting plate for the cover disposed between the top plate and the spacer and projecting beyond the spacer.

9. A cover for an opening in an ice cream cabinet comprising in combination a top plate, a bottom plate, a spacing ring separating the plates near their edges, means holding the plates together, a member between the top plate and the spacing ring and projecting beyond the spacing ring to support the cover, the edge of the top plate being formed to enclose the edge of the member, legs secured to the member and projecting into the spacing ring, and means for securing said legs to the spacing ring.

10. A lid of the character described comprising an annular rim member of insulating material, a filler member located in the opening through the said annular member, a sheet metal cover plate overlying the upper side of the said filler member, tie means located centrally of said lid to hold said filler member, said annular rim member, and said cover plate together, and means for locking the outer edge of the said sheet metal cover plate and said rim member together.

11. A lid of the character described comprising an annular rim member of insulating material, a filler member located in the opening through the said annular member, a sheet metal cover plate overlying the upper side of the said filler member, a sheet metal cover plate overlying the lower side of the said filler member, tie means located centrally of said lid to hold said filler member, said annular rim member, and both of said cover plates together, and means for locking the outer edge of the said sheet metal cover plate overlying the upper side of the filler member and said rim member together.

12. A lid of the character described comprising an annular rim member of insulating material, a filler member located in the opening through the said annular member, a sheet metal cover plate overlying the upper side of the said filler member and extending outwardly from the top edge of said annular member, tie means located centrally of said lid to hold said filler member, said annular member, and said cover plate together, and means engaging the outwardly extending portion of said cover plate and the rim member to lock the outer edge of the said sheet metal cover plate to said annular rim member.

JESSE G. KING.